Jan. 26, 1943.  F. W. BURGER  2,309,573
DUAL WHEEL STRUCTURE
Filed Nov. 26, 1941  3 Sheets-Sheet 1
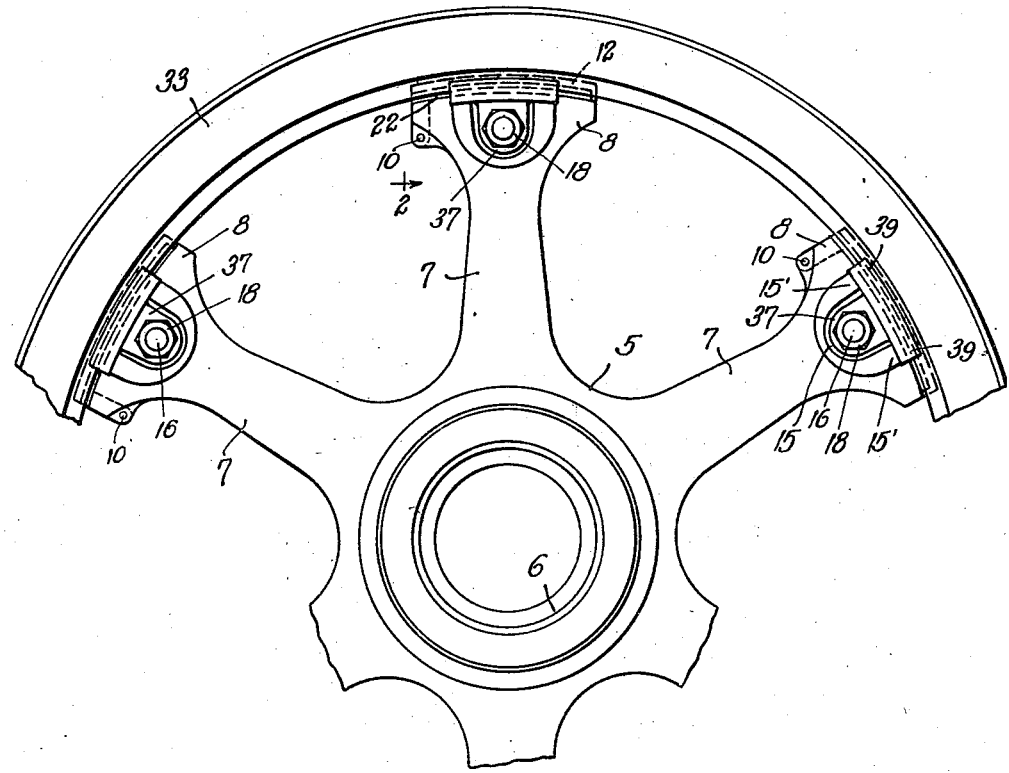
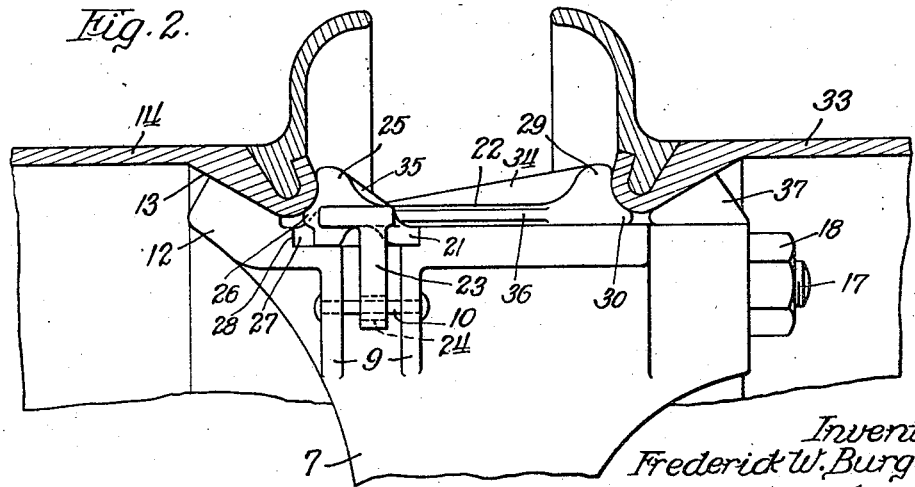
Inventor
Frederick W. Burger.
By Walter E. Schirmer.
Atty.

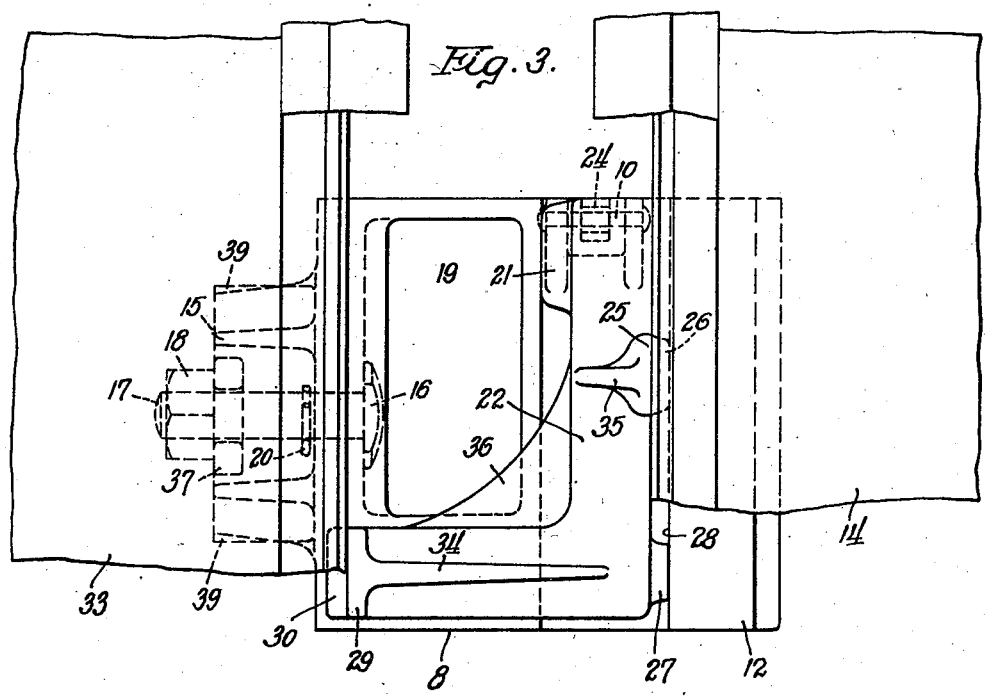
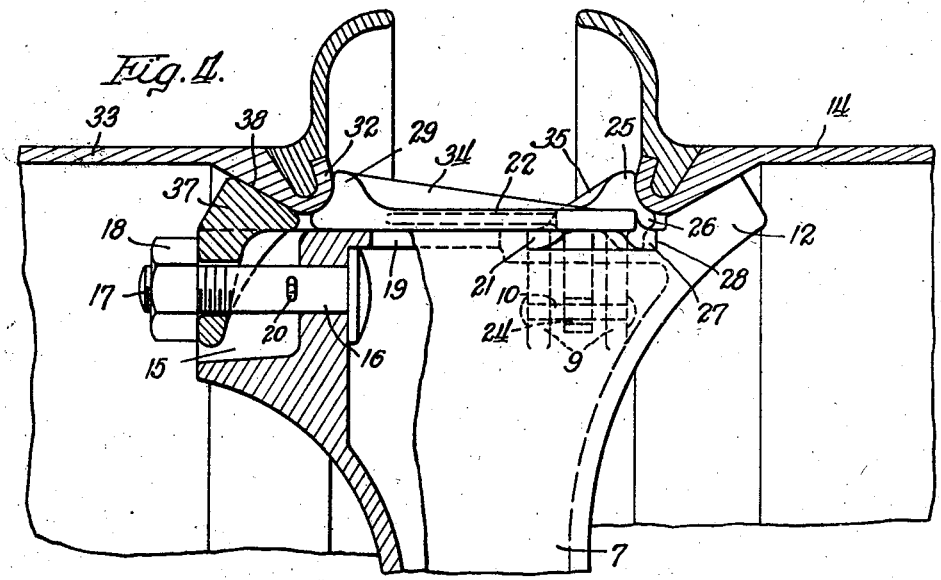

Jan. 26, 1943.   F. W. BURGER   2,309,573
DUAL WHEEL STRUCTURE
Filed Nov. 26, 1941   3 Sheets-Sheet 3
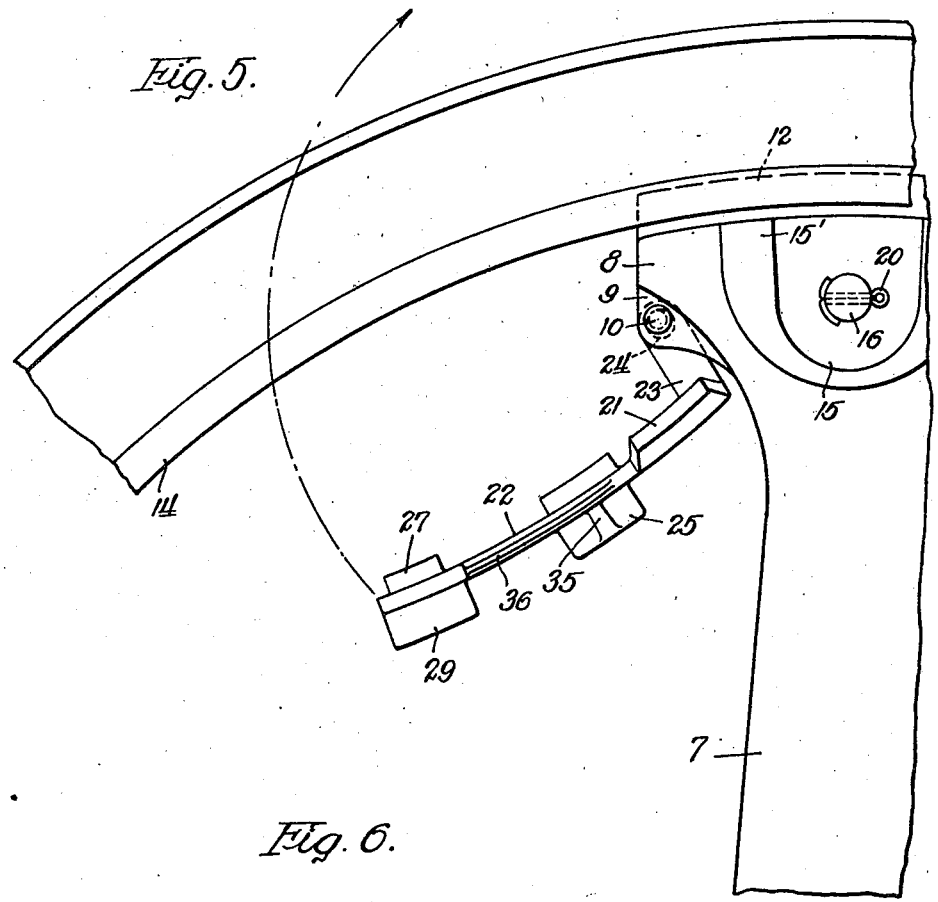
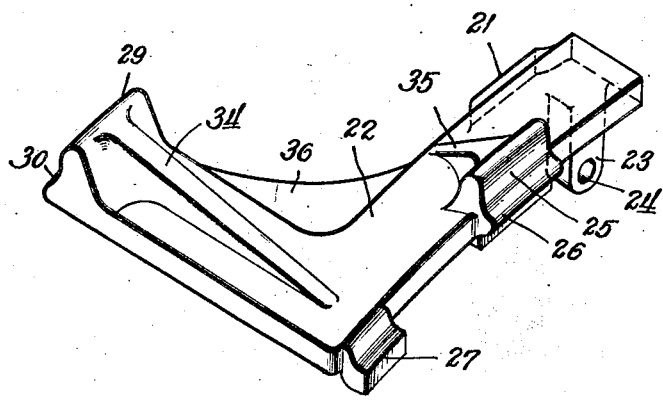
Inventor:
Frederick W. Burger.
By Walter E. Schirmer
Atty.

Patented Jan. 26, 1943

2,309,573

UNITED STATES PATENT OFFICE 2,309,573

DUAL WHEEL STRUCTURE

Frederick W. Burger, Niles, Mich., assignor to Clark Equipment Company, Buchanan, Mich., a corporation of Michigan Application November 26, 1941, Serial No. 420,448

16 Claims. (Cl. 301—13)

The present invention is directed to dual wheel structures, and is more particularly concerned with a dual wheel construction for use in trucks, busses and other heavy motor vehicles.

The present invention relates particularly to the use of a cast metal wheel spider having radially extending hollow spokes, which, at their ends are provided with means for mounting two tire rims thereon in parallel axially spaced relation, the rims being demountably secured in locked position on the spoke ends.

Heretofore, attempts have been made to provide a dual wheel structure of this general type in which the inboard end of each spoke end is provided with a beveled seat for receiving the bevel edge of the inboard tire rim. Either a continuous spacing ring or individual spacing block at each spoke end has been provided which, when engaged by the outboard rim, wedges the inboard rim into position on its beveled seat. Suitable lugs are arranged for clamping the outboard rim in position. It is with this general type of construction that the present invention is concerned.

In previous designs of this type, it has been almost impossible to maintain the two rims in parallel alinement in planes at right angles to the axis of the wheel, although many different attempts have been made to secure this result. The maintenance of the wheels in this position is essential if it is desired to eliminate undue tire wear and to maintain even wear of both tires. The main difficulty has been the fact that heretofore it has been impossible to secure adequate wedging pressure against the inboard rim to place it under the proper stresses so that it will be wedged securely in position on the inboard beveled seat, since such wedging action must come from the clamps which mounts the outboard rim. Consequently the inboard rims of previous constructions have not been tight or have been unevenly wedged upon their seats at the respective spoke ends, whereby the rim is not maintained in a true plane at right angles to the axis of the wheel.

A further disadvantage of previous constructions using a continuous spacer band has been the closing of the space between the rims intermediate the spoke ends, thereby preventing adequate ventilation to dissipate the heat from the brake drum of the wheel, and also serving as a place where mud and foreign materials may be lodged. While this has been alleviated to some extent by the use of individual spacer blocks at each spoke end, such blocks have not gained the desired mounting of the rims in other respects, and also, such blocks are subject to being lost or misplaced during changing of tires and the like.

The present invention has for one of its primary objects the provision of a spacing block which is hingedly secured to the spoke end in such manner that it may be swung out of position and into the space between adjacent spokes to allow free movement of the inboard rim into position, the block, however, being retained in connection with the spoke end so that there is no possibility of its being misplaced or mislocated in position on the spoke end.

A further object of the present invention is to provide a spacing block in which the point of abutting engagement against the inboard rim is so related to the point of abutment of the outboard rim therewith that a leverage action is secured increasing the pressure applied against the inboard rim over and above the pressure exerted by the outboard rim clamping means, and this may be increased to an extent such that a 2 to 1 ratio of leverage is obtained whereby it will be apparent that a greatly increased wedging action is produced against the inboard rim securely wedging it into position on the seat. Suitable stop means limits the swinging movement of the spacer block so as to produce a uniform positioning of the rim on each spoke end.

Another feature of the present invention resides in the provision of a spacing block which may be made as a simple casting or forging which is relatively light in weight, and which is so designed as to withstand all pressure capable of being exerted thereon by the clamping means. Since the blocks at each spoke end are uniform in construction, it is apparent that the rims will be spaced apart equal distances at each spoke end, thereby maintaining true parallel alinement of the rims in position.

Other objects and advantages of the present invention will appear more fully from the following detailed description which, taken in conjunction with the accompanying drawings, will disclose to those skilled in the art the particular construction and operation of the preferred form of the present invention.

In the drawings:

Figure 1 is an elevational view of a portion of a dual wheel assembly embodying the present invention;

Figure 2 is a sectional view through the assembly shown in Figure 1 taken substantially on line 2—2 of Figure 1;

Figure 3 is a plan view of a spoke end with the rims mounted in position thereon;

Figure 4 is a transverse view through a spoke end with a portion thereof shown in section showing the clamping arrangement;

Figure 5 illustrates the manner in which the spacing block is swung out of position during assembly of the inboard rim; and Figure 6 is a perspective view of the spacing block.

Referring now in detail to the drawings, I have provided a wheel spider, indicated generally at 5, having a hub portion 6 adapted to be mounted on an axle arm or spindle, and having the radially extending spokes 7.

The spokes 7 terminate at their ends in circumferentially enlarged shoulder portions 8, one of the shoulder portions 8 being provided with a pair of ribs 9, as shown in Figure 2, through which the pin 10 extends. At the inboard side of each spoke end there is provided the beveled shoulder 12 forming a seat for the beveled or gutter edge 13 of the inboard rim 14. The shoulders 8 of the spoke end have defined therebetween a semi-cylindrical recessed socket portion 15 through which extends the clamping bolt 16, this bolt having an outwardly projecting threaded end 17 for receiving the clamp nut 18. The outer end of the spoke is open, as indicated at 19, to provide for assembly of the bolt 16, and a suitable cotter pin 20 locks the bolt against displacement from its position.

The intermediate portion of the spoke end between the shoulder 12 and the transverse shoulders 8 is relatively flat and forms a support for the spacing block indicated generally at 22 and shown in detail in Figure 6. The spacing block 22 is of generally L-shape, and is provided at one end with the depending tongue portion 23 apertured as at 24 to fit loosely around the pin 10. On this same portion of the spacing block there is provided a raised boss portion 25 having a projecting lip portion 26, which is adapted to engage and conform to the outline of the lateral edge of the inboard rim 14, as shown clearly in Figure 4. Adjacent the junction portion of the two arms of the block 22 there is provided a short lug or abutment portion 27 which depends below the plane of the block 22, and which is adapted to engage in an undercut portion 28 of the spoke end at the inboard side thereof, this portion being recessed in a radial direction to accommodate the lug 27 which abuts against the surface 28 to limit the transverse swinging movement of the block 22 so that the inboard rims 14 are all maintained in a positive plane at right angles to the axis of the wheel.

Formed at the opposite end of the block 22 from the journal portion 23 is a second abutment shoulder 29, which has the outwardly projecting portion 30 formed in the same manner as the portions 25 and 26, and adapted to engage against the inner lateral edge 32 of the outboard rim 33. Both the portions 25 and 29 are provided with normally extending ribs 34 and 35, respectively, for strengthening the same since it is at this point that the maximum pressures occur on the spacing block. A suitable reinforcing web 36 is provided between the intermediate portion of the block 22.

Mounted on the bolt 16 is a clamping lug generally shown at 37 having a wedge surface 38 adapted to engage the bevel edge or gutter of the outboard rim 33 and having transversely extending wing portions 39 riding on the surfaces of shoulders 8 to maintain the lug against tipping movement as it is being drawn inwardly by the nut 18.

In the operation of the device as thus far described, the blocks 22 are first swung into the position shown in Figure 5, whereby they move into a withdrawn position between the spoke ends so as to be out of the way while the inboard rim 14 is moved axially over the spoke ends into position on the shoulder 12. Because of the loose fit of the block 22 on the pin 10, the block can then be swung into position with the portion 25 engaging against the lateral edge of the rim 14, the block being rotated about the pin 10 into position laying on the end surface of the spoke end with the portions 26 and 27 lying in the recessed portion of the spoke end. The outboard rim is then moved into position against the abutments 29 of the spacing block after which the lugs 37 are moved axially inwardly by the nut 18. This carries the rim 33 axially inwardly against the abutment 29 of the block 22, which in turn rotates the block in a transverse plane about its pivot 10. This rotation causes the abutment 25 engaging the inboard rim 14 to wedge this rim on the seat 12. Due to the difference in distance between the pin 10 and the abutment 25 as compared to the pin 10 and abutment 29, a much greater pressure is effected against the inboard rim than is produced by the clamping lug against the outboard rim. The leverage thus available is sufficient to insure tightening the inboard rim positively upon the wedge surface 12, and due to this leverage, the rim can be tightened into position and the spacing block 22 moved so that shoulder 27 abuts shoulder 28, thereby maintaining the inboard rim in true radial position. At the same time the wedge block 37 wedges the outboard rim radially outwardly to chord the same intermediate the spoke ends, this chording also taking place on the inboard rim 14 due to the increased leverage available thereon. With the two rims thus positioned when the nut 18 has been fully tightened, it will be apparent that the rims will be spaced apart the same distance at each spoke end, and thus will be maintained in parallel alinement. Similarly, by reason of the abutting engagement between the projection 27 against the shoulder 28, the inboard rim will be maintained in a plane at right angles to the axis of the wheel, and consequently the outboard rim will also be maintained in a parallel plane. This insures positive alinement of the rims on the wheel spider and produces a construction heretofore not attainable in such a marked degree in the prior art.

It will be apparent that the machining of the shoulder 28 in conjunction with the forming of the projection 27 will produce the result desired so far as positive alinement is concerned. The ratio of force produced by the spacing of the abutments 25 and 29 in the preferred form of the invention is at least 2 to 1, so that sufficient force will be available on the inboard rim to insure that it will be positively wedged beyond the shoulder 12 regardless of manufacturing tolerances, both as to the machining of the shoulder 12 and the rolling of the beveled edge of the inboard rim.

The present construction lends itself well to accessibility of changing tires and the like, since it is only necessary to remove the nuts 18 in order to remove the outboard rim 33, and, if the inboard rim need be changed, the spacer blocks 22 can be rotated into the position shown in Figure 5, and the inboard rim is then free to move axially outwardly over the spoke ends.

I am aware that various changes may be made in certain details of the present construction, and I therefore do not intend to be limited except as defined by the scope and spirit of the appended claims.

I claim:

1. In combination, a wheel spider having radially extending spokes provided with an inclined rim seat at the inboard side of the ends thereof, a rim having a bevel edge adapted to engage said seat, independent spacing blocks hinged to each spoke end for swinging movement in the plane of said spider and adapted to overlie the spoke end when in operative position, a second rim mounted on the outboard side of said spoke ends, axially movable clamp means on each spoke end for forcing said second rim axially against said blocks and thereby forcing said blocks axially against said inboard rim, said blocks having limited cocking movement at their hinge connection to the spoke ends.

2. A dual wheel assembly including a spider having radially extending spokes, a bevel rim seat formed at the inboard side of each spoke end, an edge mounted rim carried by said seats, a spacing block having a loose hinge connection to the spoke end and swingable from a position intermediate adjacent spoke ends into a position overlying the spoke end, said block having an abutment engaging the lateral face of said rim, a second rim mounted on the outboard end of said spoke ends, a second abutment on said block engaged by the adjacent lateral face of said rim, and clamp means carried by each spoke end for wedging said outboard rim axially inwardly whereby said block transmits said axial pressure to said inboard rim, said block abutments being at different distances from the hinge connection of said block to produce an increase in pressure on said inboard rim.

3. A dual wheel assembly comprising a spoked wheel spider having fixed inboard rim seats, spacing means hingedly connected to the spoke ends of said spider and operative to overlie said spoke ends, an inboard tire rim on said inboard seat, an outboard tire rim on said spoke ends axially abutting said spacing means, and clamping means for said outboard rim exerting axial pressure thereon which is transmitted by said spacing means to wedge said inboard rim on said fixed seat, said spacing means having limited lateral movement over said spoke end.

4. A dual wheel assembly as set forth in claim 3 further characterized in the provision of means on said spacing means projecting partially under the adjacent lateral faces of said rims to prevent radial outward swinging movement of said spacing means.

5. A dual wheel assembly as set forth in claim 3 further characterized in the provision of circumferentially spaced abutments on said spacing means respectively engaged by said rims for producing a difference of pressure on the inboard rim as compared to that applied by said clamping means to the outboard rim.

6. A dual wheel assembly as set forth in claim 3 further characterized in the provision of means limiting lateral movement of said spacing means toward said inboard seat.

7. A dual wheel assembly comprising a wheel spider having radially extending spokes provided with a fixed inboard rim seat, spacing means hinged to each spoke end and arranged to swing from a position intermediate said spoke ends into a position overlying the spoke ends, a circumferential channel formed in each spoke end, said spacing means having circumferentially offset abutments engaging opposite walls of said channel limiting cocking movement of said spacing means on said spoke end, a rim supported on said inboard seat, a second rim, and clamping means on said spoke ends for supporting said second rim and moving it axially toward said first rim, said spacing means transmitting said movement to said inboard rim to wedge it on said fixed seat.

8. The assembly of claim 7 further characterized in the provision of circumferentially offset shoulders on said spacing means respectively engaged by said rims to produce an increased pressure on said inner rim.

9. The combination, in a wheel spider adapted to receive two oppositely arranged edge mounted tire rims, of a spoke end on said spider having a beveled inner rim seat receiving one of said rims, hinge means on one circumferential side of said spoke end, a spacing block having one end carried by said hinge means for swinging said block into a position overlying said spoke end, said block having limited cocking movement on said spoke end about said hinged end thereof, the outboard rim being adapted to laterally engage said block at a point removed from said hinge end, clamp means on said spoke end for moving said outboard rim axially against said block, and abutment means on said block engaging said inboard rim at a point closer to said hinged end than said outboard rim to produce a mechanical advantage in transferring pressure to said inboard rim.

10. The combination of claim 9 including means on said block engaging under each rim to prevent radial displacement of said block from between said rims.

11. The combination of claim 9 including means forming a stop for limiting axial inward movement of said block to maintain said rims in parallel alinement at right angles to the axis of the wheel spider.

12. A spacing block for the spoke ends of a dualwheel spider comprising an L-shaped member having a depending boss at the end of one leg portion for receiving a hinge pin, a laterally facing raised abutment intermediate the ends of said one leg portion, a second raised abutment at the end of the other leg portion of said member, said abutments being adapted to be engaged by adjacent faces of tire rims mounted on said spider.

13. The block of claim 12 further characterized in the provision of means extending outwardly from the base portions of said abutments and operable to engage under the lateral edges of said tire rims.

14. A wheel comprising a wheel body having radially extending spokes, a spacing block hinged to the end of each spoke and operable in one position to overlie the end of the spoke, and in another position to lie intermediate adjacent spokes, a pair of tire rims, a fixed seat for the inboard one of said rims on the end of each spoke, clamping means carried by the outboard end of said spoke for moving said rims axially toward said inboard seat, said outboard rim moving against said block and said block transmitting pressure to said inboard rim, and abutment means on said spoke end and on said blocks limiting axial movement of said blocks to locate said inboard rim in a plane at right angles to the axis of the wheel.

15. In combination, a wheel body having radially extending spokes, a spacing block hingedly secured to each spoke end to swing from a position overlying the spoke end into a position between adjacent spokes and radially within the spoke circle, a pair of bevel edge tire rims, a fixed seat on the inboard side of said spoke end for mounting the inboard tire rim when said blocks are in said last-named position, said blocks being swung to said first-named position to hold said inboard rim against displacement, lug means mounting the other rim on the outboard side of said spoke ends, and clamp means for drawing said lug means axially inwardly to wedge said outboard rim against said blocks and said blocks against said inboard rim.

16. The combination of claim 15 further characterized in abutment surfaces on said spoke ends engaging said blocks to limit axial movement of said blocks for preventing misalinement of said inboard rim out of a plane at right angles to the axis of the wheel body.

FREDERICK W. BURGER.